United States Patent [19]

Melliger

[11] 4,111,371

[45] Sep. 5, 1978

[54] GRANULATION PROCESS

[75] Inventor: Guido W. Melliger, Dover, N.J.

[73] Assignee: Firma Dierks & Sohne Maschinenfabrik, Osnabrueck, Fed. Rep. of Germany

[21] Appl. No.: 795,154

[22] Filed: May 9, 1977

Related U.S. Application Data

[62] Division of Ser. No. 508,422, Sep. 23, 1974, Pat. No. 4,037,794.

[51] Int. Cl.² .............................................. B02C 23/30
[52] U.S. Cl. ........................................ 241/18; 241/24
[58] Field of Search ................... 241/46.11, 46.17, 52, 241/57, 65, 79 L, 15, 17, 18, 19, 24

[56] References Cited

U.S. PATENT DOCUMENTS

| | | | |
|---|---|---|---|
| 3,713,594 | 1/1973 | Blakely et al. | 241/46.17 |
| 3,877,649 | 4/1975 | Herfeld | 241/65 |

Primary Examiner—Granville Y. Custer, Jr.

[57] ABSTRACT

This invention provides a process for the preparation of dry-medicament granulation. An apparatus for practicing such process comprises an enclosed-circular mixing chamber containing mixing means with a separate air inlet means and air outlet means, both of which are in flow communication with the chamber. The air outlet means is provided with a collecting means for collecting the dry-fine particles of the medicament granulation and may be equipped with a vibrator or other means for returning them to the mixing chamber. The process provides a one step preparation in a batch process of medicament granulations, whereby the granulation may be directly compressed into solid-dosage forms without further processing.

6 Claims, 3 Drawing Figures

GRANULATION PROCESS

This application is a division of application Ser. No. 508,422, filed Sept. 23, 1974, now U.S. Pat. No. 4,037,794, issued July 26, 1977.

This invention provides a process for the preparation of dry medicament granulations. More particularly, it provides a process for preparing dry medicament granulations in a one step batch process, whereby the granulation, without further processing, may be formed into solid-dosage pharmaceutical preparations.

Prior art preparation of medicament granulations is a complicated process requiring numerous steps to obtain a final product. Generally, the steps involved are: (1) sifting the raw materials to delump agglomerations; (2) the mixing of the ingredients and compacting the mixed material into granules after the addition of granulating liquids; (3) drying the mixture to remove the solvents; and (4); sizing of the dry product by breaking any agglomerations and by eliminating over- and under- sized particles.

Recent advances in the apparatus in the art of granulation have included the introduction of the fluidized bed granulator. Basically, this granulator is a fluidized bed dryer adapted to handle the mixing and compacting steps of the granulating process. However, even this advance in the art has certain inherent limitations. The most detrimental of which is the fact that fluidized beds are poor mixers which may require the manually breaking up of agglomerates.

It is an object of this invention to prepare dry medicament granulations in a one step batch process 4the necessity for additional handling involved in the drying step.

The above and other objects of the invention will be understood from the following detailed description and drawings, wherein.

Figure 1:
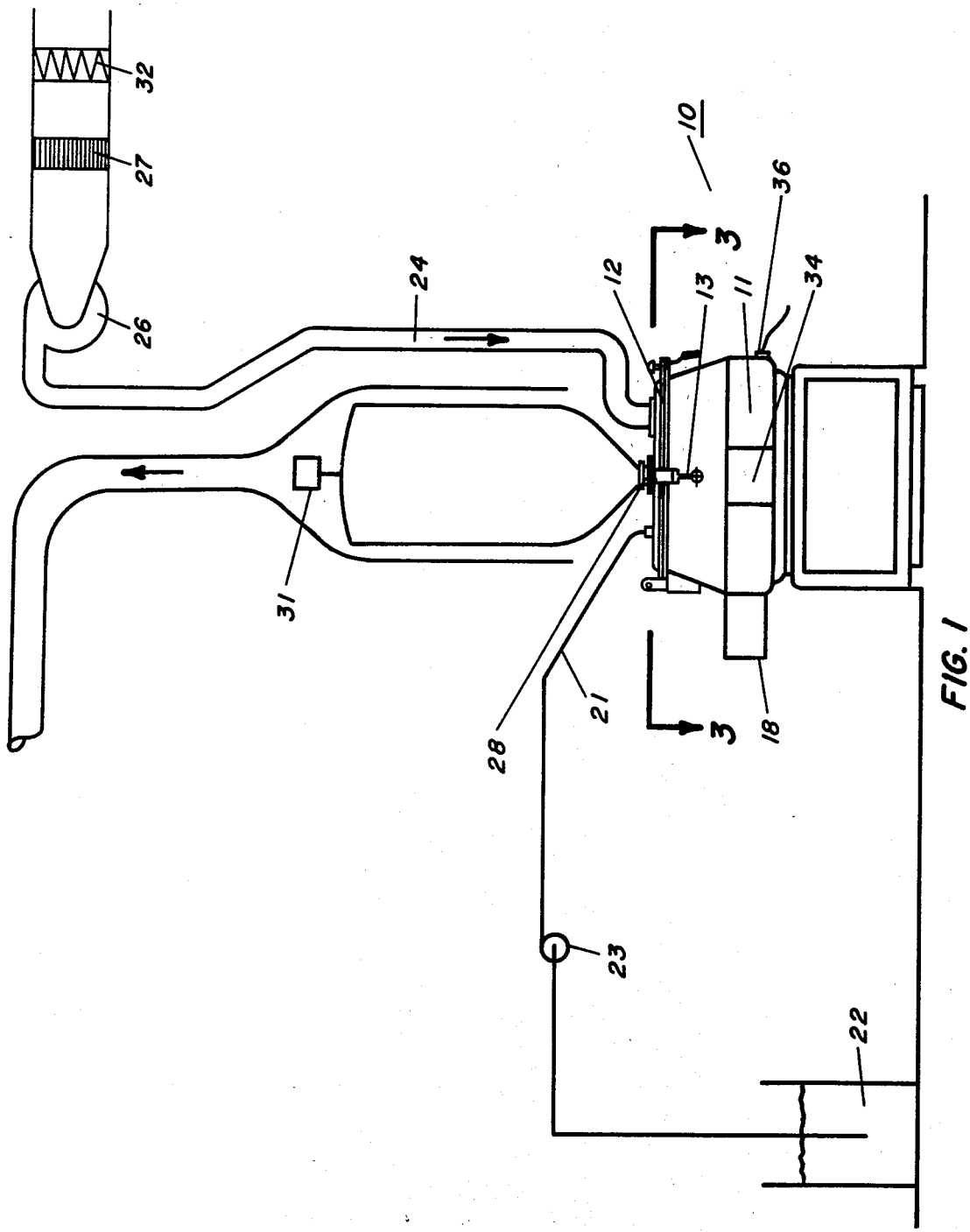
FIG. 1 is a frontal view of granulation apparatus used in the practice of this invention.

Broadly, this invention provides a process for the preparation of dry medicament granulations; the apparatus shown for practicing the invention comprises in combination, an enclosed circulatory mixing chamber having a sealable loading port and a mixing means, a separate air inlet means and an air outlet means both of which are in flow communication with the chamber. The air outlet means is provided with a means for collecting dry-fine particles of the medicament granulation, and the collecting means are further provided with means for returning the dry particles to the mixing chamber. Also provided, are means for introducing granulating liquids into the mixing chamber.

The mixing means preferably comprises a plurality of separately rotating mixing blades and chopper blades, each of which have a variable speed control. The mixing blades are mounted at the base of the mixing chamber and rotate horizontally with respect to the vertical axis of the chamber, while the chopper blades are mounted on the circular walls of the chamber and rotate vertically with respect to the horizontal axis of the chamber. The air outlet means consists of a conduit communicatively connected between the mixing chamber and the collecting means, which may be, for example, a filter bag, which is porous to the exiting air, but is impervious to the fine granular particles which may exit from the mixing chamber. The filter is in communication with a vibrator apparatus, which with the air flow turned off and upon vibration of the filter loosens the particles collected therein and returns them to the mixing chamber.

In the operation of the apparatus of this invention, the dry medicament materials are added to the mixing chamber, via the loading port. The port is then sealed and the mixing blades set in rotatable motion. With the rotation of the mixing blades, granulating liquids are introduced into the mixing chamber, via a conduit from a liquid storage tank and are blended with the dry medicament material. As the material and the liquid are blended, air is introduced into the chamber, via a conduit from an air supply source, which source may contain a filter and a heater for raising the temperature of the drying air. As the blend of medicament and granulating liquids are maintained in an agitated state due to the motion of the mixing blades and the chopper blades, air is circulated through the blend. The air may be introduced tangentially into the mixing chamber and together with the rotation of the mixing blades generates a vortex within the mixing chamber resulting in a cyclone effect, which acts as a centrifugal separator. Because of this cyclone effect, only the fine-dry particles of the granulation are swept up in the drying air stream and removed from the mixing chamber and trapped in the filter. The fine particles collect on the inner surface of the filter and when the build up of particles is such as to interfere with the air flow through the filter, the air flow is turned off and a vibrator, which is in communication with the filter is actuated and the particles are vibrated loose from the inner surface of the filter bag and returned to the mixing chamber for reblending with the dry granulation.

In the granulation process, air flow is dependent upon the volume of the mixing chamber, e.g., a 600 liter chamber requires an air flow of from about 100 to 800 CFM preferably, 150 to 400 CFM. The air entering the chamber is initially at ambient temperature, because the mixing of the granulation causes a rise in the internal temperature of the granulation. As the granulation becomes drier, its temperature drops and the rotation of the mixing blades is reduced, while the incoming air temperature is raised to maintain an optimum granulation temperature. Optimal granulation temperature is from 40° to 60 °C, and is maintained by raising the air temperature incrementally to about 40° to 70° C.

Figure 2:
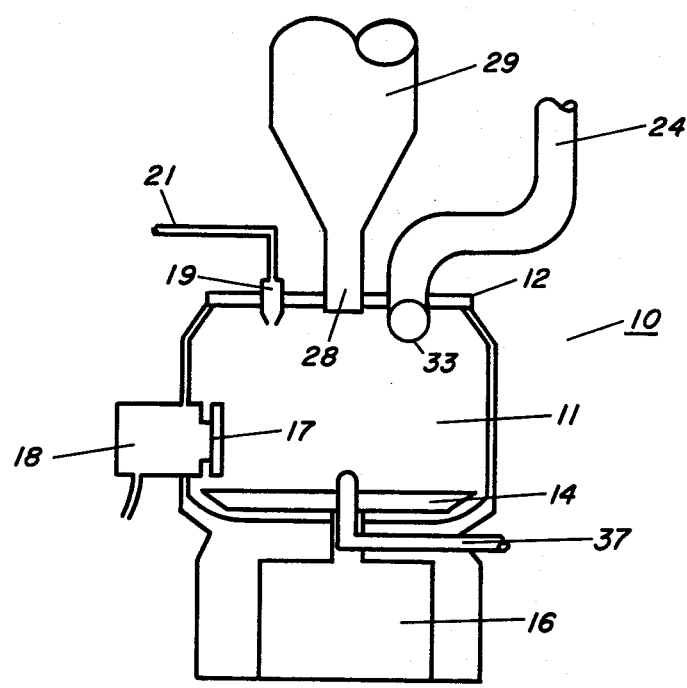
FIG. 2 is a sectional view of the granulation apparatus of FIG. 1 the section being taken along the line 2—2 in FIG. 3.

The above described apparatus will best be understood by the following detailed description:

Referring now to FIG. 1, there is shown, generally, at 10 the granulating means of the apparatus. The dry medicament formulation is introduced into the mixing chamber 11 (e.g., 600 liter volume) of the apparatus, via the port 12. In the drawings, this port is shown as a hinged cover mounted on the top of the mixing apparatus, however, it is understood that this port may be a portion of the top as its size is not critical to the operation of the apparatus. When the dry medicament formulation has been loaded into the mixing chamber, the port 12 is sealed, via latches 13. The mixing blades 14 (see FIG. 2) are actuated by the motor 16 and are initially rotated at their maximum rotatable speed. The chopper blades 17 are also set in motion at the same time by the actuation of motor 18, while the liquid granulating material, e.g., solvents binders are introduced into the mixing chamber 11 through inlet conduit 19, via conduit 21 from the liquid storage tank 22 by means of a pump 23. After the dry materials and the liquid granulating materials have been mixed for a period of time, e.g., about 1 to 5 minutes, air is introduced to the mixing chamber 11, via conduit 24 from an air supply blower 26. The air is filtered by a filter 27 prior to its introduction into a conduit 24. The air at this time is at ambient temperature and the rotational speed of the mixing blades and the chopper may now be reduced to a slow speed. The internal temperature of the mixing chamber is desirably maintained at from 40° to 60° C., preferably, 45° to 50° C. during the entire drying process. The air temperature is gradulally raised by means of heater 32 over a period of about 5 minutes to a temperature between 40° and 70° C., preferably 50° to 60° C., and the entire operation maintained at this rotational speed and temperature for about 1 hour. At the first indication of fine-dry particles, the chopper speed is reduced to slower speed, to lessen the chance of fines.

Figure 3:
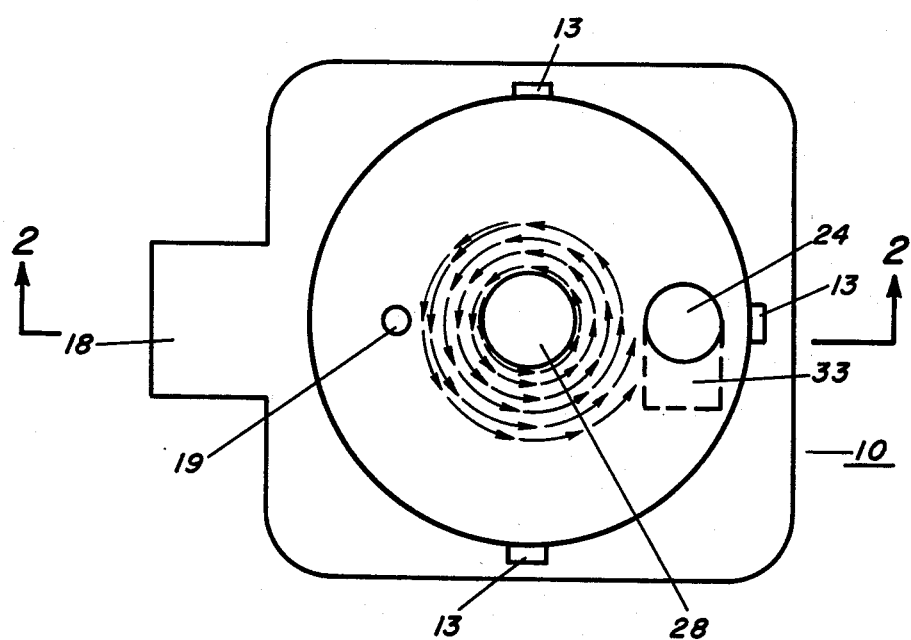
FIG. 3 is a view in horizontal section of the apparatus of FIG. 1 the section being taken along the line 3—3 in FIG. 1.

The rotational movement of the blades and the tangential introduction (see FIGS. 2 and 3, reference numeral 33) of the air into the mixing chamber creates, as noted above, a vortex within the mixing chamber causing the fine-dry particles to be separated from the mixing mass and carried on the exitng air, via conduit 28 into the filter chamber 29. The filter chamber may be a filter bag, which as described above, is porous to the exiting air but is impervious to the granulated particles. when a sufficient amount of the fine granulated particles have collected on the inside of the filter, the vibrator 31 is actuated, via means not shown to vibrate the filter bag 29 and cause the particles to settle back into the mixing chamber 11, desirably at the end of the granulation process.

After the granulation has been dried, the apparatus is stopped, an exit port 34 opened and the granulation batch removed for processing into solid dosage forms.

As noted above, it is desirable to maintain the granulation temperature at from 40° to 60° C. Granulation temperature may be monitored by conventional means, for example, by a temperature sensor 36 affixed to the outside surface of the mixing chamber 11. Since the granulation as it is blended in the chamber is in contact with the walls of the chamber, the outside sensor 36 is a reliable indicator of the granulation temperature.

In one embodiment of this invention, air may be brought into the mixing chamber through means other than through conduit 24 at the top of the mixing chamber 11. For example, air may be introduced into the mixing chamber, via conduit 37 through the mixing blades 14 at the base of the mixing chamber 11, (see FIG. 2). Air may also be introduced into the mixing chamber, simultaneously, through both top conduit 24 and bottom conduit 37.

As can be appreciated by those skilled in the art, the process of this invention provides a rapid and economical process for a one step batch processing of medicament formulations into granulations that are suitable for immediate conversion into pharmaceutical-solid dosage forms.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A one step batch process for the preparation of dry medicament granulations, which comprises the steps of:
    (a) Blending the medicament formulation and granulating liquids in a mixing chamber;
    (b) Introducing air into the mixing chamber;
    (c) Maintaining the blend of medicament formulation and granulating liquids in an agitated state in the chamber, while continuing air flow through the blend to dry it;
    (d) Removing the air from the chamber;
    (e) Collecting fine-dry particles of the blend which exits from the chamber with the air in a collecting means and returning them to the chamber; and
    (f) Removing the final dry blend from the mixing chamber for further processing.

2. The process according to claim 1, wherein the blending of the medicament formulation and granulating liquids comprises a rotary mixing and chopping action to maintain the ingredients in a fluidized like state.

3. The process according to claim 2, wherein the drying air is introduced tangentially into the mixing chamber and together with rotary mixing generates a vortex within the mixing chamber acting as a centrifugal separator, such that the fine-dry particles of the granulation may be removed from the mixing chamber.

4. The process according to claim 3, wherein the collected dry-fine particles are returned to the mixing chamber by a vibratory action in the collecting means.

5. The process according to claim 3, wherein the drying air is introduced to the mixing chamber at from about 100 to 800 CFM and initially at ambient temperature and the air temperature is raised incrementally to about 40° to 70° C, while maintaining the mixing chamber temperature at from about 30° to 60°C.

6. The process according to claim 5, wherein a high rotary mixing and chopping action is initially maintained and the rotary mixing action is reduced when the air is introduced into the chamber.

* * * * *